US00RE36616E

United States Patent [19]

Park

[11] E Patent Number: Re. 36,616

[45] Reissued Date of Patent: Mar. 14, 2000

[54] LIGHT FIXTURE

[75] Inventor: Byung-Gil Park, Kyungki-Do, Rep. of Korea

[73] Assignee: Tae Wha Industrial Co., Ltd., Kyungki-Do, Rep. of Korea

[21] Appl. No.: 08/803,768

[22] Filed: Feb. 24, 1997

Related U.S. Patent Documents

Reissue of:

[64] Patent No.: 5,404,264
Issued: Apr. 4, 1995
Appl. No.: 08/208,939
Filed: Mar. 10, 1994

[51] Int. Cl.[7] ..... F21S 1/02

[52] U.S. Cl. ..... 362/363; 362/360; 362/369

[58] Field of Search ..... 362/351, 352, 362/356, 363, 367, 432, 457, 360

[56] References Cited

U.S. PATENT DOCUMENTS

| | | | |
|---|---|---|---|
| 347,478 | 8/1886 | Egan . | |
| 435,795 | 9/1890 | Butler . | |
| 3,365,571 | 1/1968 | Koziol | 240/11.2 |
| 3,895,226 | 7/1975 | Murray et al. | 240/11.2 R |
| 4,245,283 | 1/1981 | Hahlen | 362/306 |
| 4,712,166 | 12/1987 | Stewart | 362/147 |
| 4,972,308 | 11/1990 | Chen | 362/367 |
| 5,287,259 | 2/1994 | Lautzenheiser | 362/341 |

FOREIGN PATENT DOCUMENTS

| | | | |
|---|---|---|---|
| 26 04 840 | 8/1977 | Germany | 362/367 |

OTHER PUBLICATIONS

Regal–Lite Catalog No. 383, dated Mar. 1983.

*Primary Examiner*—Stephen Husar
*Attorney, Agent, or Firm*—Senniger, Powers, Leavitt & Roedel

[57] ABSTRACT

A light fixture of the present invention comprises a base, a top spaced above the base, a plurality of upright bars (channels) formed as parts separate from the top and the base and extending up from the base to the top of the light fixture for holding a series of panels of transparent sheet material, such as glass, to form an enclosure for a lamp, and fasteners for attaching upper and lower ends of each bar to the top and the base, respectively. Each of the bars is an extruded part of one-piece construction configured to have a spine, and a channel-forming structure projecting inwardly from the spine to form a pair of channels which extend lengthwise of the bar and which open laterally for receiving respective edges of two adjacent panels of said series of panels. The spine and the channel-forming structure of each bar are integrally formed as a one-piece extrusion.

10 Claims, 3 Drawing Sheets

LIGHT FIXTURE

Matter enclosed in heavy brackets [ ] appears in the original patent but forms no part of this reissue specification; matter printed in italics indicates the additions made by reissue.

BACKGROUND OF THE INVENTION

This invention relates generally to light fixtures and, more particularly, to light fixtures such as outdoor lanterns fabricated from plastic and/or metal parts.

This application has particular application to light fixtures of the type comprising a base, a top spaced above the base, and a plurality of glass panels at the sides of the fixture which form an enclosure for a lamp. The glass panels are held in place by upright bars extending up from the base to the top of the fixture, typically at the corners of the fixture.

In prior designs involving metal fixtures, the base and top of the fixture are formed either of cast metal or of stamped sheet metal, and the panel-holding bars (sometime referred to as "channels") are fabricated from sheet metal, such as sheet aluminum, stamped and bent to form elongate members with laterally-opening channels for receiving respective side edges of the glass panels. This prior construction has several drawbacks. First, channels fabricated from sheet metal have a surface finish which looks substantially different from the surface finish of cast-metal parts. In a fixture having a cast-metal top and base, this difference in appearance detracts from the overall appearance of the fixture. Another drawback is that channels formed from stamped and bent sheet metal lack the structural strength and rigidity of an extruded member. Also, the channels of the prior design have a tendency to corrode when subjected to outdoor conditions.

In prior designs involving plastic fixtures, the channels are traditionally molded as an integral part of the base, the top being a separate molded member. This construction restricts design flexibility compared to a modular system where the base, top and channels are separate pieces.

SUMMARY OF THE INVENTION

Among the several objects of this invention may be noted the provision of an improved light fixture having a top, a base, and panel-holding bars (channel bars) having an exterior finish and appearance matching that of the top and base; the provision of such a light fixture with channel bars having greater structural strength and rigidity than prior designs; the provision of such a light fixture wherein the channel bars have a greater resistance to corrosion; the provision of such a light fixture which has a modular construction for greater design flexibility; the provision of such a fixture which is easy to assemble; and the provision of such a light fixture which is economical to manufacture.

Generally, a light fixture of the present invention comprises a base, a top spaced above the base, a plurality of upright bars (channel bars) formed as parts separate from the top and the base and extending from the base up to the top of the light fixture for holding a series of panels of transparent sheet material, such as glass, to form an enclosure for a lamp, and fasteners for attaching upper and lower ends of each bar to the top and the base, respectively. Each of the bars is an extruded bar of one-piece construction configured to have a spine, and a channel-forming structure projecting inwardly from the spine to form a pair of channels which extend lengthwise of the bar and which open laterally for receiving respective edges of two adjacent panels of said series of panels. The spine and the channel-forming structure of each bar are integrally formed as a one-piece extrusion.

Other objects and features will be in part apparent and in part pointed out hereinafter.

BRIEF DESCRIPTION OF THE DRAWINGS

Corresponding parts are designated by corresponding reference characters throughout the several views of the drawings.

DETAILED DESCRIPTION OF PREFERRED EMBODIMENTS

Figure 1:
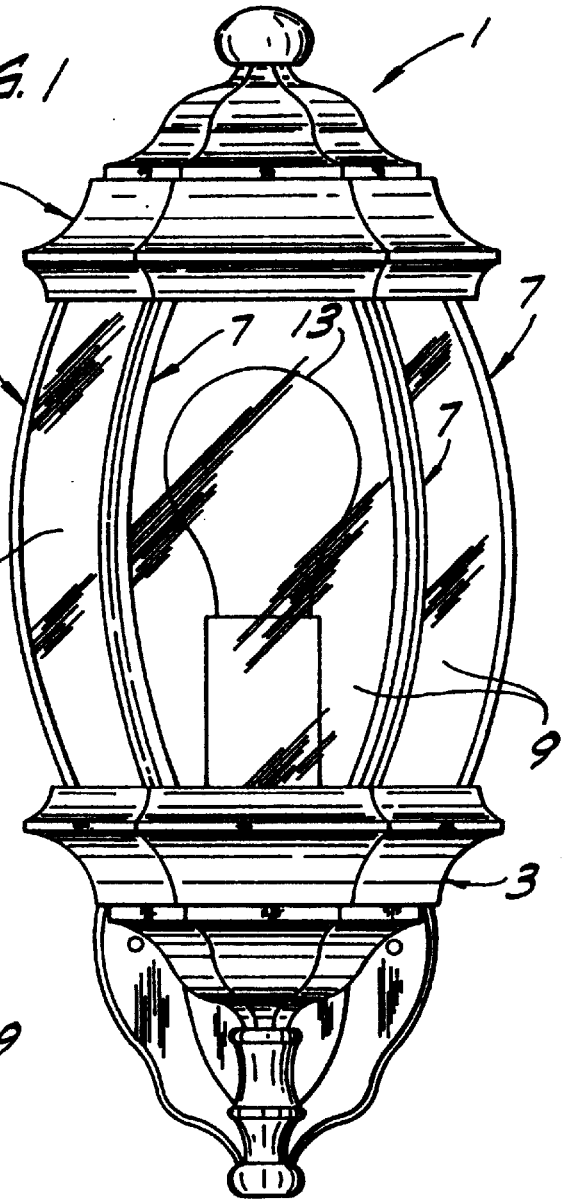
FIG. 1 is a front elevation of a light fixture of this invention.
Figure 2:
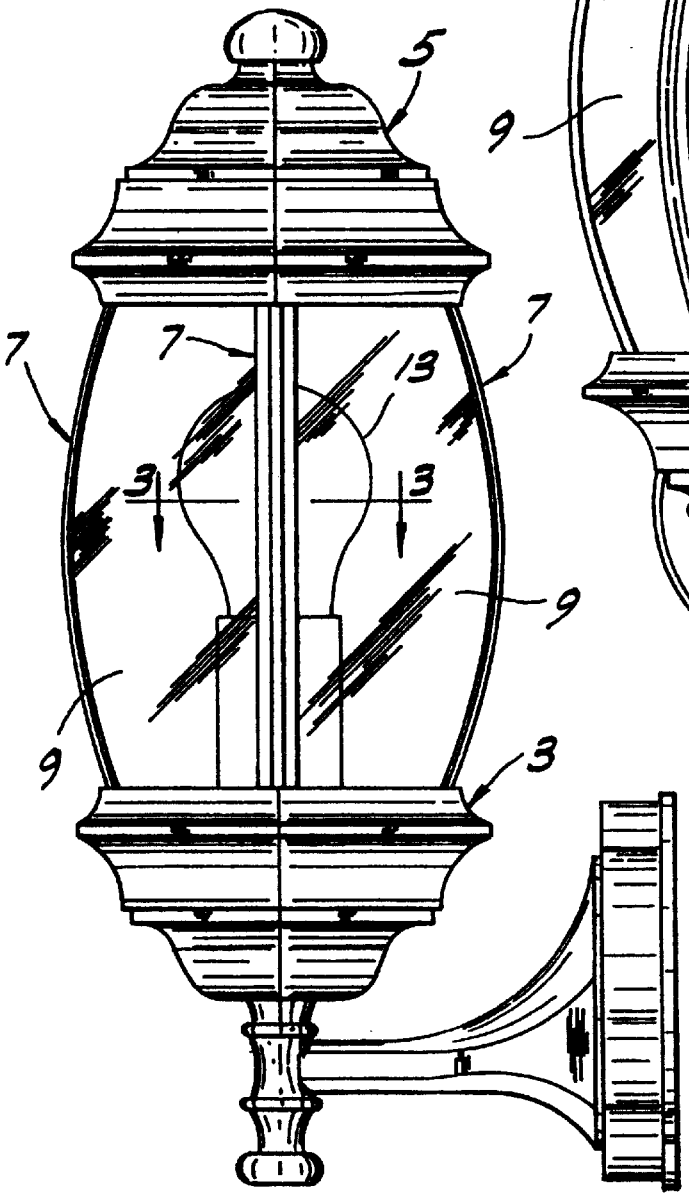
FIG. 2 is a side elevation of the light fixture of FIG. 1.
Figure 5:
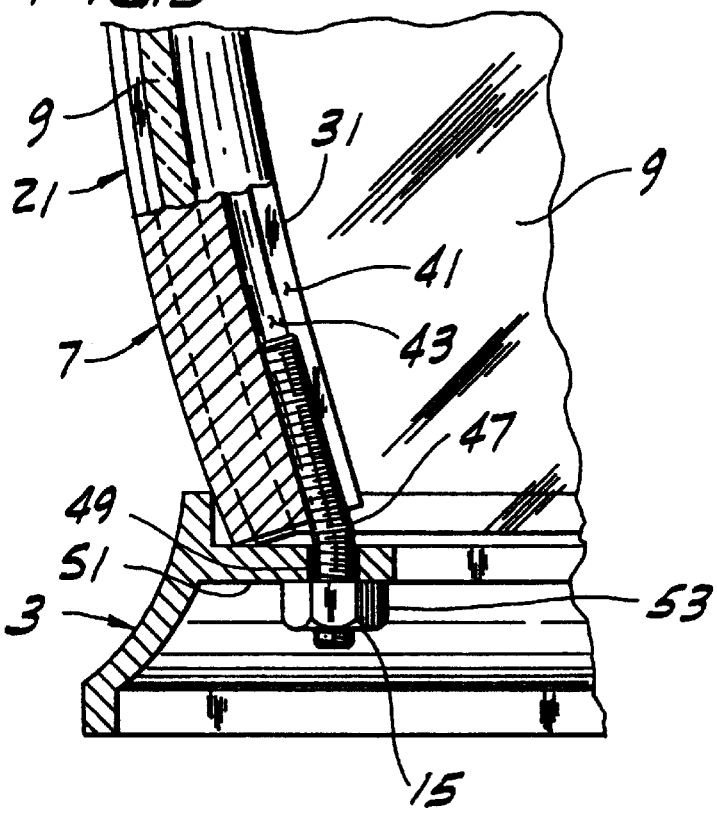
FIG. 5 is an elevational view showing how a bent channel bar of this invention is fastened to the base of the fixture, parts being broken away to show details of the fastening.

Referring now to the drawings, and first more particularly to FIG. 1, a light fixture of the present invention is designated in its entirety by the reference numeral 1. The fixture comprises an outdoor lantern having a cast-metal base 3, a cast-metal top 5 spaced above the base, and a plurality of upright bars (referred to hereinafter as channel bars), each generally designated 7, formed as parts separate from the base and the top and extending up from the base to the top of the fixture for holding a series of panels of transparent sheet material (typically glass). The base 3, top 5, and panels 9 of the fixture form an enclosure for a conventional lamp 13. The upper and lower ends of the channel bars 7 are attached to the top and base of the fixture, respectively, by fasteners, each indicated generally at 15 (FIG. 5).

Figure 3:
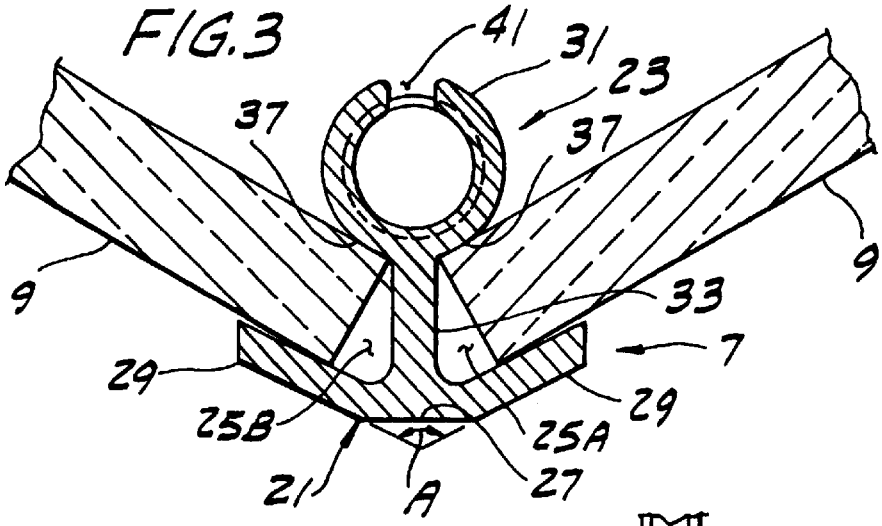
FIG. 3 is an enlarged horizontal section taken on lines 3—3 of FIG. 2 illustrating an extruded channel bar of this invention holding a pair of panels.
Figure 4:
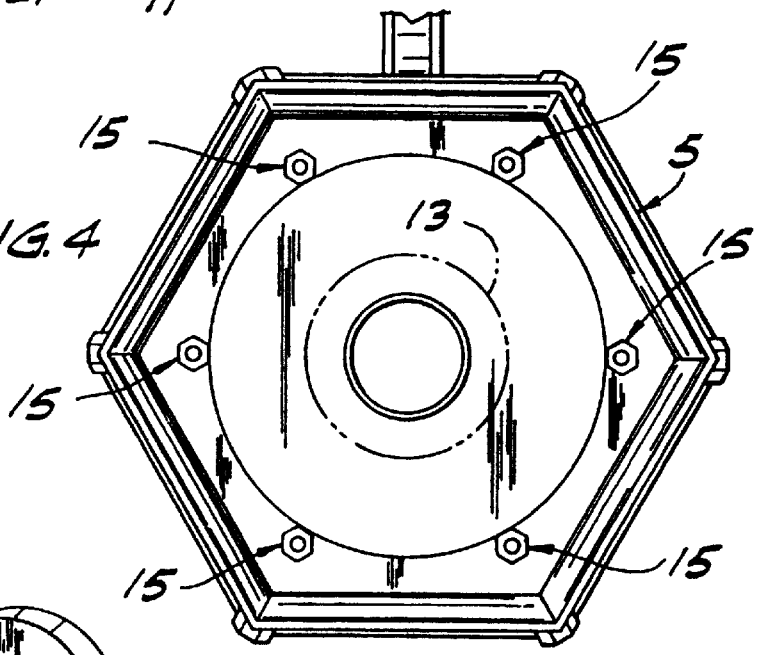
FIG. 4 is a top plan of the light fixture with a top piece of the fixture removed to show details.

In accordance with this invention, each of the channel bars 7 is an extruded metal bar (of brass or aluminum, for example, to match the base and top). As best illustrated in FIG. 3, each bar is of one-piece construction and configured to have a spine, generally designated 21, and a channel-forming structure, generally designated 23, projecting inwardly toward the enclosure from the spine to form a pair of channels indicated at 25A and 25B which extend lengthwise of the bar (i.e., in an up-and-down direction) and which open laterally for receiving respective edges of two adjacent panels 9. The spine 21 has a center portion 27 and opposite side portions 29 which angle laterally outwardly from the center portion at a suitable angle A (e.g., 100–130 degrees).

The channel-forming structure 23 comprises an elongate formation 31 which extends of the length of the bar 7 generally parallel to the spine 21, and flange means comprising a flange *in the form of a web* 33 connecting the elongate formation and the spine. The [flange] *web* 33 is preferably connected to the center portion 27 of the spine so that it extends generally along the longitudinal centerline of the spine and projects from the spine generally at right angles to the spine. The side walls of each of the two aforementioned channels 25A, 25B are defined by a respective side portion 29 of the spine and a respective opposing portion 37 of the elongate formation 31, and the bottom wall of each channel is defined by the [flange] *web* 33. The junctures between the bottom and side walls of each channel are suitably rounded, as shown in FIG. 3.

Figure 6:
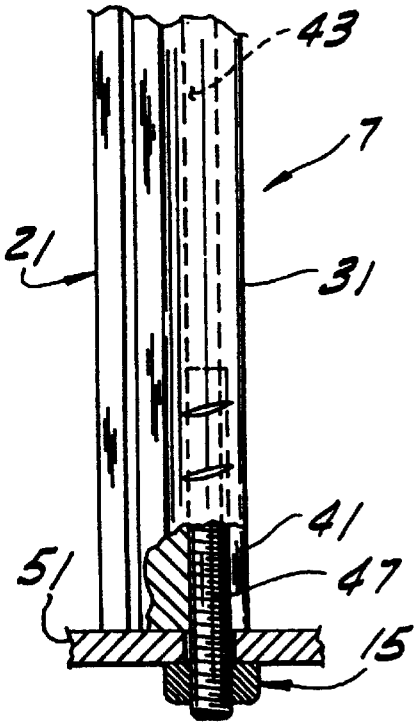
FIG. 6 is a view similar to FIG. 5 showing a straight channel bar.

The elongate formation 31 is arcuate in transverse section and preferably comprises a sleeve having a longitudinal slot 41 therein extending the full length of the sleeve. The sleeve 31 is preferably generally circular in shape, but other shapes may also be used. The sleeve defines openings 43 at opposite ends of the channel bar for receiving the fasteners 15 used to fasten the bar to the base 3 and top 5 of the fixture. FIG. 5 illustrates a typical fastener arrangement in which a threaded metal stud 47 is secured within one end of the sleeve 31. This may be accomplished, for example by crimping the sleeve so that it tightly grips the stud. The stud 47 projects endwise from the channel bar 7 through a hole 49 in a wall 51 of the base 3 of the fixture. A nut 53 is threaded on the lower end of the stud 47 to secure the lower end of the channel bar to the base. The upper end of the channel bar may be secured to the top 5 of the fixture in identical fashion. As shown in FIG. 5, the channel bar 7 may be bent according to the desired shape of the fixture. If the bar is bent, it is preferred that the stud 47 also be bent so that it extends generally vertically to facilitate attachment to the top 5 and base 3 of the fixture. Of course, if the channel bar 7 is straight, as shown in FIG. 6, the stud 47 will typically also be straight, not bent.

*As noted above, the web 33 connecting the spine 21 and the sleeve 31 is relatively thin. As shown in FIG. 3, the thickness of this web in a direction transverse to the length of the bar 7 is substantially less than the outside diameter of the sleeve. The web is flat, substantially planer and extends inwardly from the center portion 27 of the spine to the sleeve. The plane of the web is diametric with respect to the circular sleeve shown in FIG. 3.*

Figure 7:
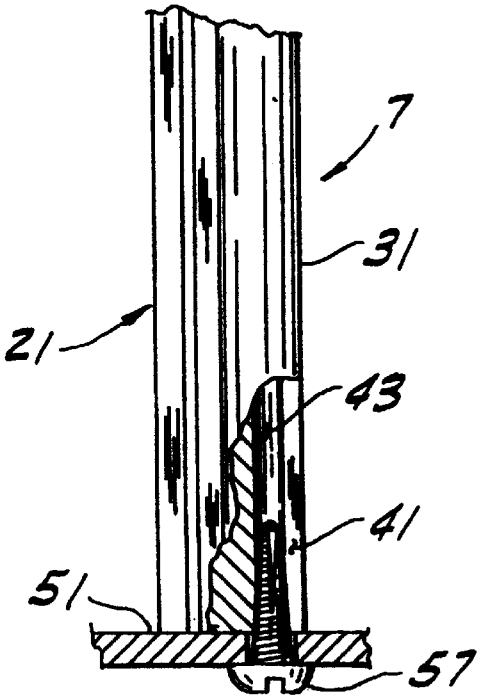
FIG. 7 is a view similar to FIG. 6 showing a different fastening design.

FIG. 7 shows a different fastener arrangement using a self-tapping screw 57 to attach the channel bar 7 to the base of the fixture. In this design, the sleeve 31 and screw 57 should be sized so that the screw bites into the sleeve as it is threaded up through the base into the sleeve. Of course, the upper end of the channel bar may be fastened to the top of the fixture in the same manner. If self-tapping screws are used, a longitudinal slot in the sleeve may not be necessary.

FIGS. 1–5 show an outdoor lantern 1 having a cast-metal base 3 and a cast-metal top 5. These parts have a suitable exterior finish. Since the channel bars 7 are extruded pieces, they can be extruded from the same metal as the base and top, and they can be treated so that the visible exterior surfaces of the bars have the same finish and appearance as the finish and appearance of the visible exterior surfaces of the cast-metal top 5 and cast-metal base 3 of the fixture for providing an attractive and overall uniform "look" to the fixture. In prior designs, where the channel bars are of stamped metal, this was not possible.

As mentioned above, because the channel bars 7 are one-piece extruded parts, they are stronger and more rigid than prior channel bars fabricated from stamped and bent sheet metal. The extrusion is cut to suitable length and then bent, if necessary, to the desired shape (e.g., FIG. 5), according to the design of the light fixture.

Another important advantage of the extruded design of the channel bars is that they are more resistant to corrosion due to moisture, for example. This is because they do not have the creases and cavities associated with prior sheet metal channel bars.

Figure 8:
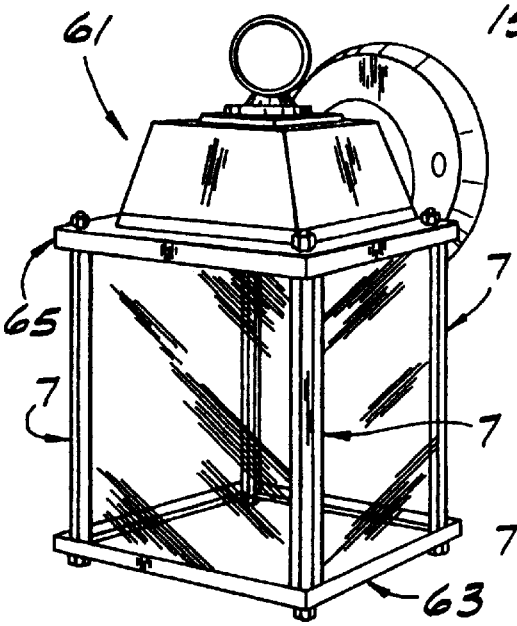
FIG. 8 is a perspective of a sheet metal fixture using extruded channel bars of this invention.
Figure 9:
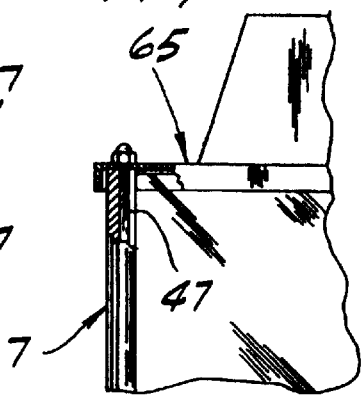
FIG. 9 is an elevational view of the fixture of FIG. 8 illustrating how a channel bar is fastened to the top of the fixture.
Figure 10:
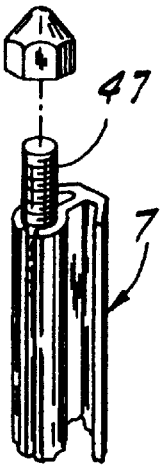
FIG. 10 is an enlarged view illustrating the fastener of FIG. 9.

The extruded channel bars of this invention may also be used in a light fixture 61 of the type shown in FIGS. 8–10, where the base 63 and top 65 of the fixture are fabricated from stamped and bent sheet metal. The channel bars 7 are attached to the base 63 and top 65 in a manner essentially identical to that described above, as illustrated in FIGS. 9 and 10.

The extruded channel bars of this invention may also be used in plastic light fixtures where the base and top are molded plastic parts, and the channel bars are extruded plastic parts. The design of the plastic channel bars and the fastening arrangements are preferably identical to that described above, and the appearance of the plastic fixture may be identical to that shown in FIGS. 1–10.

It will be observed that the channel bars of this invention are formed as parts separate from, rather than integral with, the base of the fixture and top of the fixture. This permits greater design flexibility, since different tops and bases may be readily combined in modular fashion using the same channel bars.

As noted above, the channel bars of this invention are extruded parts. The method of extrusion may vary, but one method which has been found to be suitable is the "direct" method in which a heated billet of channel bar material is rammed through a die.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A light fixture comprising a base, a top spaced above the base,

*a series of panels of transparent sheet material, each of said panels having a thickness,* a plurality of upright bars formed as parts separate from the top and the base and extending up from the base to the top of the light fixture for holding [a] *said* series of panels of transparent sheet material[, such as glass,] to form an enclosure for a lamp, and fasteners for attaching upper and lower ends of each bar to the top and the base, respectively, each of said bars being an extruded part of one-piece construction configured to have a spine, and a channel-forming structure projecting inwardly from the spine toward the enclosure to form a pair of channels which extend lengthwise of the bar and which open laterally for receiving respective edges of two adjacent panels of said series of panels, said spine and said channel-forming structure being integrally formed as a one-piece extrusion, said channel-forming structure comprising an elongate formation which extends the length of the bar and which is spaced inwardly toward the enclosure from and generally parallel to the spine of the bar, said elongate formation defining a first side wall of each of the two channels of said pair of channels, and flange means connecting the elongate formation and the spine and defining a bottom wall of each of the two channels of said pair of channels, said spine defining a second wall opposing the first wall of each of said two channels, said flange means extending generally along a longitudinal centerline of the spine,

*said elongate formation comprising a deformable sleeve having a longitudinal slot extending the length of the sleeve, said sleeve having open ends for receiving said fasteners,*

*said flange means comprising a web integrally connecting the spine and the sleeve, said web extending inwardly from said spine to said sleeve a distance greater than the thickness of a respective panel whereby an edge of one of said panels can be inserted between the spine and the sleeve.*

2. A light fixture as set forth in claim 1 wherein said spine, top and base have exterior surfaces facing outwardly away from said enclosure, said exterior surfaces having substantially identical surface finishes for providing a uniform appearance.

3. A light fixture as set forth in claim 2 wherein the base and top are of cast metal, and wherein each of said bars is an extruded metal part.

4. A light fixture as set forth in claim 2 wherein the base and top are fabricated from stamped sheet metal, and wherein each of said bars is an extruded metal part.

5. A light fixture as set forth in claim 1 wherein the base and top are molded plastic parts, and wherein each of said bars is an extruded plastic part.

[6. A light fixture as set forth in claim 1 wherein said elongate formation is arcuate in transverse cross-section and defines openings at opposite ends of the formation for receiving said fasteners.]

[7. A light fixture as set forth in claim 1 wherein said elongate formation comprises a sleeve having a longitudinal slot extending the length of the sleeve.]

8. A light fixture as set forth in claim [7] *1* wherein said fasteners are self-tapping screws threadable into opposite ends of said sleeve for attachment of the bar to the top and base of the light fixture.

9. A light fixture as set forth in claim [7] *1* said fasteners are threaded studs secured in opposite ends of said sleeve, said studs extending endwise beyond the ends of the sleeve for attachment to the top and base of the light fixture.

*10. A light fixture as set forth in claim 1 wherein said spine has a center portion and opposite side portions which angle laterally away from the center portion, and wherein said web is flat, substantially planar and extends inwardly from the center portion of the spine to said sleeve.*

*11. A light fixture as set forth in claim 10 wherein said sleeve is circular in cross section, and wherein said web extends in a plane which is diametric with respect to the sleeve.*

*12. A light fixture as set forth in claim 1 wherein said sleeve is deformable by crimping around said fasteners to secure the fasteners in the sleeve.*

* * * * *